W. WALLACE.
CHAIN.

No. 61,777.  Patented Feb. 5, 1867.

United States Patent Office.

WILLIAM WALLACE, OF ANSONIA, CONNECTICUT.

Letters Patent No. 61,777, dated February 5, 1867.

IMPROVEMENT IN CHAINS.

*The Schedule referred to in these Letters Patent and making part of the same.*

TO ALL WHOM IT MAY CONCERN:

Be it known that I, WILLIAM WALLACE, of Ansonia, New Haven county, in the State of Connecticut, have invented a new kind of Chain; and I do hereby declare that the following is a full and exact description thereof, reference being had to the accompanying drawings, making part of this application.

My invention relates to a new method of forming a chain, or ornamental metallic guard. Previous to my invention, as I am aware, a great variety of chains have been made by uniting in infinitely different ways variously shaped pieces. My invention consists in a chain formed of hollow spheres, linked together by means of small bars, having their heads (or enlarged ends) retained within the said hollow spheres, all as will be hereinafter more fully explained.

To enable those skilled in the art to make and use my invention, I will proceed to describe it more fully, referring by letters to the accompanying drawings, in which—

Figure 1:
Figure 1 illustrates a piece of my new kind of chain, (a portion being shown in section to show the shape of the pieces better.)
Figure 2:
Figure 2 represents the shape of the parts out of which the chain is made before they are put together.

The shape and nature of the parts or pieces of which the chain is formed (or manufactured,) as seen at $A'$ $a\ a^2$, fig. 2, explain themselves, and consist simply of double-headed rivets or bars, $a\ a^2$, and short tubes, $A'$, formed of brass, or any other metal, or suitable material. To put the parts together, or link them, to form the chain, one of the tubes $A'$ has inserted into each end, while in a suitable die, one of the bars $a\ a^2$, as seen at fig. 2. The tube $A'$ is then subjected to the action of dies, by which its ends are closed over, and it is made to assume the shape seen at fig. 1, and embrace one of the heads of each of the bars $a\ a^2$. Another tube is then connected to the other head of bar $a^2$ and one head of another bar, and so on; a chain is formed by thus connecting the tubes and double-headed pieces by thus forming the balls over the heads of the bars. Of course machinery may be devised and employed which will automatically perform the operation of shaping up or forming the tubes over the bar-heads; but in my present application I need only explain some method by which they can be united. I have shown the tubes or balls as being shaped up into a spherical form, but, of course, they may be varied somewhat from that shape without departing from my invention, the gist of which rests in the idea of forming the chain by means of pressing or otherwise bending or forming the ends of short tubes over the enlarged ends or heads of double-headed bars or rivets, substantially as set forth.

It will be seen that my invention may be employed in the manufacture of any size chain, and may be made very strong, though I at present contemplate its use mainly in the manufacture of ornamental chain work and for chandelier chains, watch chains, &c., &c.

Having explained my invention, so that those skilled in the art can make and use it, what I claim as new, and desire to secure by Letters Patent, is—

A chain formed by uniting hollow balls and double-headed bars, substantially in the manner hereinbefore described.

In witness whereof I have hereunto set my hand this 10th day of August, 1866.

WILLIAM WALLACE.

Witnesses:
J. N. McINTIRE,
CHAS. SPEER.